(12) United States Patent
Wheatley

(10) Patent No.: US 7,204,540 B2
(45) Date of Patent: Apr. 17, 2007

(54) METHOD FOR COVERING STRUCTURE HAVING AUTOMATIC COUPLING SYSTEM

(76) Inventor: Donald G. Wheatley, 4451 Ford Rd., Ann Arbor, MI (US) 48105

( * ) Notice: Subject to any disclaimer, the term of this patent is extended or adjusted under 35 U.S.C. 154(b) by 0 days.

(21) Appl. No.: 11/262,988

(22) Filed: Oct. 31, 2005

(65) Prior Publication Data
US 2006/0049659 A1 Mar. 9, 2006

Related U.S. Application Data

(63) Continuation-in-part of application No. 11/227,019, filed on Sep. 15, 2005, now Pat. No. 7,025,403, which is a continuation of application No. 10/826,079, filed on Apr. 16, 2004, now Pat. No. 6,976,724.

(51) Int. Cl.
B60P 7/02 (2006.01)
(52) U.S. Cl. .............................. 296/100.16; 296/100.18
(58) Field of Classification Search ........... 296/100.16, 296/100.18, 37.6, 121, 100.15
See application file for complete search history.

(56) References Cited

U.S. PATENT DOCUMENTS

| | | | |
|---|---|---|---|
| 4,279,064 A * | 7/1981 | Simme .................. | 296/100.16 |
| 5,076,338 A * | 12/1991 | Schmeichel et al. ... | 296/100.16 |
| 5,174,353 A * | 12/1992 | Schmeichel et al. ..... | 160/368.1 |
| 5,207,262 A | 5/1993 | Rushford | |
| 5,758,922 A * | 6/1998 | Wheatley ................ | 296/100.15 |
| 5,984,379 A | 11/1999 | Michel et al. | |
| 6,042,174 A | 3/2000 | Durrani | |
| 6,053,558 A * | 4/2000 | Weldy et al. ........... | 266/100.18 |
| 6,234,561 B1 | 5/2001 | Huotari | |
| 6,309,006 B1 * | 10/2001 | Rippberger ............. | 296/100.16 |
| 6,322,129 B2 | 11/2001 | Huotari | |
| 6,439,640 B1 * | 8/2002 | Wheatley ................ | 296/100.18 |
| 6,543,836 B1 * | 4/2003 | Wheatley ................ | 296/100.18 |
| 6,561,561 B2 | 5/2003 | Getzschman et al. | |
| 6,568,740 B1 * | 5/2003 | Dimmer ................. | 296/100.16 |
| 6,607,234 B1 * | 8/2003 | Schmeichel ............ | 296/100.16 |
| 6,672,644 B2 * | 1/2004 | Schmeichel ............ | 296/100.15 |
| 6,811,203 B2 | 11/2004 | Wheatley | |
| 2001/0010430 A1 | 8/2001 | Mentink | |
| 2001/0042987 A1 | 11/2001 | Getzschman et al. | |
| 2002/0109371 A1 * | 8/2002 | Wheatley ................ | 296/100.16 |
| 2004/0124658 A1 | 7/2004 | Wheatley | |
| 2004/0212212 A1 | 10/2004 | Spencer et al. | |

OTHER PUBLICATIONS

TruXport™; Economic Alternative to Snaps, Clips & Zip-Style Strips; No date.

(Continued)

*Primary Examiner*—Kiran B. Patel
(74) *Attorney, Agent, or Firm*—Harness, Dickey & Pierce, P.L.C.

(57) ABSTRACT

A tonneau system for a cargo box of a vehicle having a support frame connectable to the cargo box. A cover spans the support frame and is positionable between a tensioned position and an untensioned position. A pivot block is mounted to the support frame, while the cover is coupled to a rear bracket member. The rear bracket member carries the cover and pivotally engages the pivot block such that the rear bracket member rotates between a raised position and a lowered position. The rear bracket member can be automatically locked in the lowered position.

14 Claims, 15 Drawing Sheets

OTHER PUBLICATIONS

Lund Genesis; Lund GenesisTM; Lund GenesisTM Rollup Tonneau Bed Cover; Dec. 7, 2005; at http://www.realtruck.com TruXedo®; Lo Pro; Engineered For a Sleek, Clean Look Lo Profile Soft Roll-Up Tonneau Cover; No date.

Orginal TruXedo®; Strongest in the Industry All Climate Soft Roll-Up Tonneau Cover; No date.

Agri-Cover, Inc.; Agri-Cover, Inc.; Company Brochure; pp. 1-19; No date.

TonneauMasters; Superior Craftmanship Quality Engineered, Frame-Mounted Tonneau Covers; Sep. 2005.

* cited by examiner

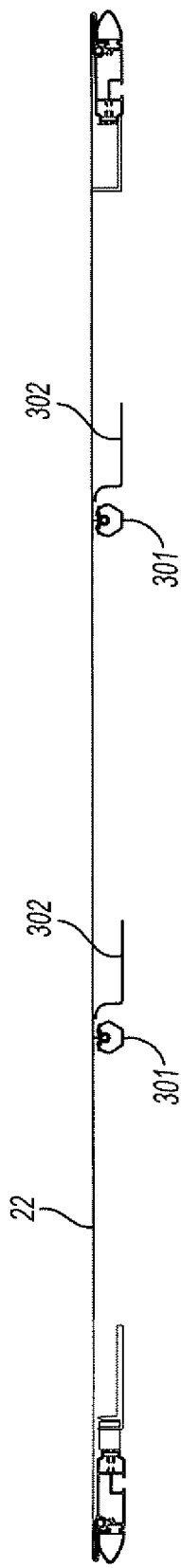
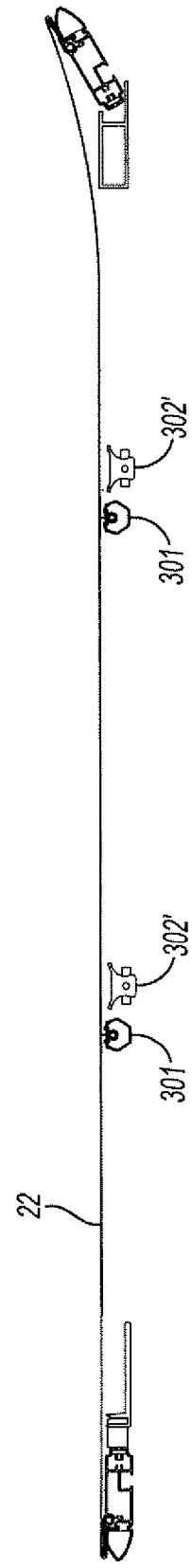

METHOD FOR COVERING STRUCTURE HAVING AUTOMATIC COUPLING SYSTEM

CROSS-REFERENCE TO RELATED APPLICATIONS

This application is a continuation-in-part of U.S. patent application Ser. No. 11/227,019 filed on Sep. 15, 2005, U.S. Pat. No. 7,025,403, which is a continuation of U.S. patent application Ser. No. 10/826,079 filed on Apr. 16, 2004, U.S. Pat. No. 6,976,724. The disclosures of the above applications are incorporated herein by reference.

FIELD OF THE INVENTION

The present invention generally relates to coverings for pickup trucks and, more particularly, relates to a roll up tonneau cover system.

BACKGROUND OF THE INVENTION

Tonneau covers have been used for a number of years to cover the cargo box of pickup trucks against dirt, debris, and other environmental contaminants and to improve the aesthetic quality thereof. Current tonneau covers often employ a VELCRO® hook-and-loop fastening system operably coupled between a soft tarp of the tonneau cover and the sidewalls of the cargo box of the pickup truck. This arrangement permits the tarp to be coupled to the cargo box to conceal the contents thereof or, alternatively, to be rolled up to reveal the contents of the cargo box of the pickup truck. The VELCRO® has disadvantages of wearing over time, pulling, and not allowing the fabric to move freely, which may result in a puckered and wrinkled appearance.

A series of bows are typically coupled to the tarp and span the width of the cargo box. These bows serve to support and minimize accumulation of dirt, debris, and other environmental contaminants from collecting on top of the tarp. When the tarp is rolled up, these bows are often enclosed within the tarp bundle.

Typically, these bows are cylindrical in cross-section and the ends thereof rest upon rails fixed to longitudinal sidewalls of the cargo box of the pickup truck. However, often times these bows fail to minimize the lifting action caused by aerodynamic forces during vehicle travel. That is, conventional soft or roll-up type tonneau covers often suffer from flapping at highway speeds, which can lead to premature failure.

Accordingly, there exists a need in the relevant art to provide a tonneau cover system capable of overcoming the aerodynamic lifting forces caused during vehicle travel. Additionally, there exists a need in the relevant art to provide a tonneau cover system capable of reliably coupling the tonneau cover to the vehicle at various longitudinal locations. Still further, there exists a need in the relevant art to provide a tonneau cover system capable of overcoming the disadvantages of the prior art.

SUMMARY OF THE INVENTION

According to the principles of the present invention, a tonneau system for a cargo box of a vehicle having an advantageous construction is provided. The tonneau cover system a support frame connectable to the cargo box. A cover spans the support frame and is positionable between a tensioned position and an untensioned position. A pivot block is mounted to the support frame, while the cover is coupled to a rear bracket member. The rear bracket member carries the cover and pivotally engages the pivot block such that the rear bracket member rotates between a raised position and a lowered position. The rear bracket member can be automatically locked in the lowered position.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 13 is a cross section view illustrating the tonneau cover system of the present invention in the retained position employing a retaining bracket;

FIG. 14 is a cross section view illustrating the tonneau cover system of the present invention in the released position employing a retaining block member;

DETAILED DESCRIPTION OF THE PREFERRED EMBODIMENTS

The following description of the preferred embodiments is merely exemplary in nature and is in no way intended to limit the invention, its application, or uses.

Figure 1:
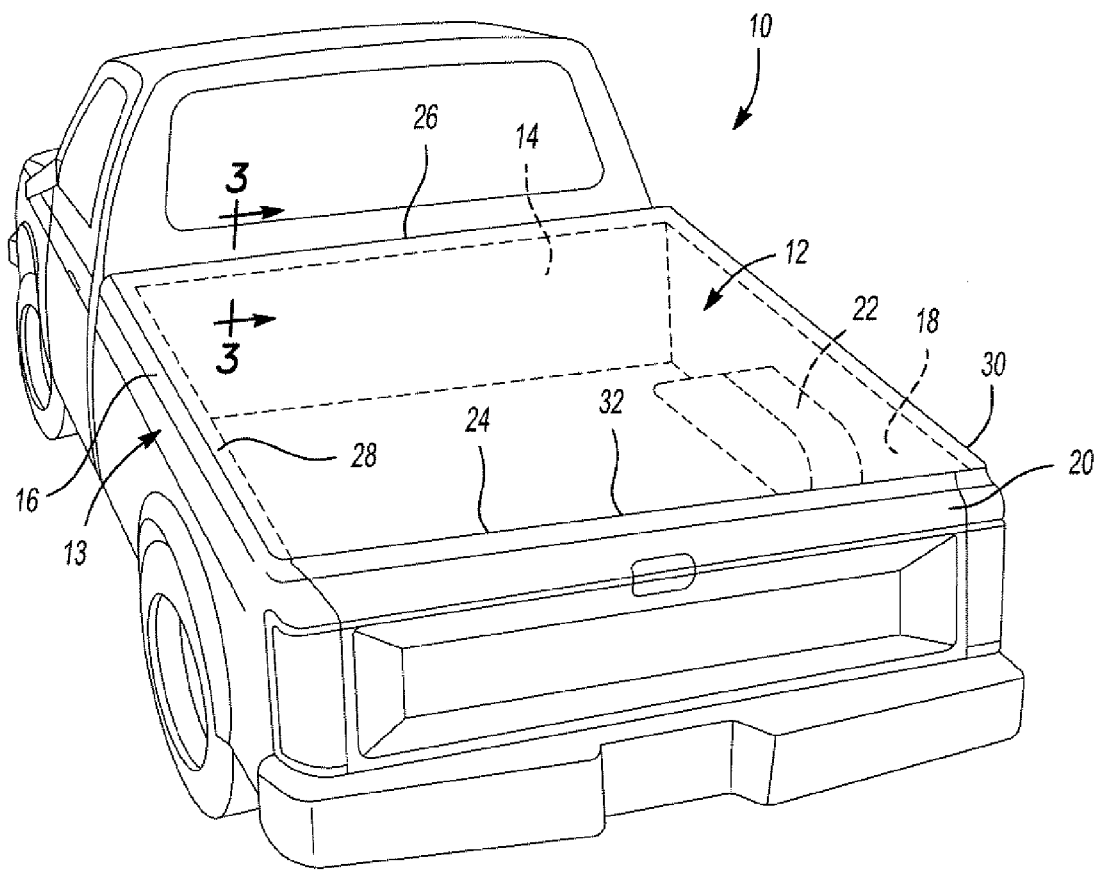
FIG. 1 is a perspective view illustrating a pickup truck having a tonneau cover system according to the principles of the present invention.
Figure 2:
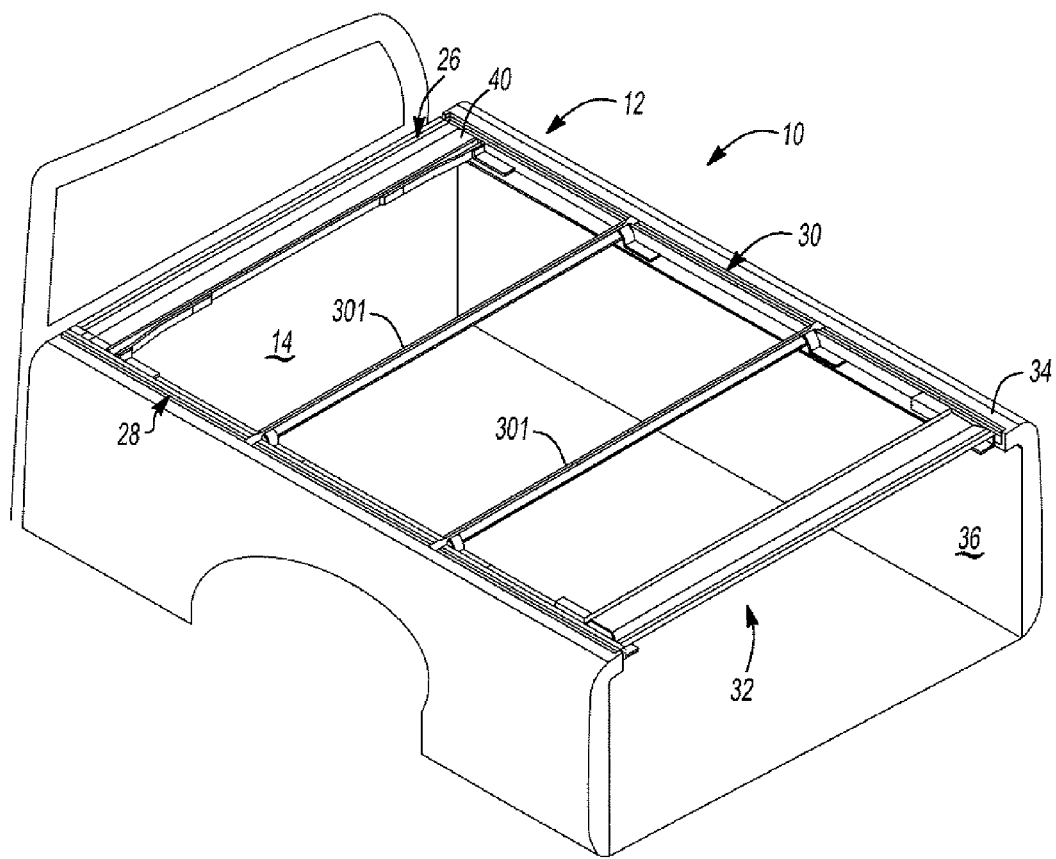
FIG. 2 is a perspective view illustrating the pickup truck having the tonneau cover system according to the principles of the present invention with portions removed for clarity.

With reference to FIGS. 1 and 2, a pickup truck 10 is shown having a roll up tonneau system 12 which is attached to a cargo box 13 according to the present invention. Cargo box 13 has a front wall 14, a left sidewall 16, a right sidewall 18, and a rear wall or tailgate 20. Roll up tonneau system 12 includes a flexible, stretchable fabric cover 22 that is drawn tightly over a substantially rigid rail support system 24 and removably attached to rail support system 24. Rail support system 24 is comprised of a number of frame rails that are attached to one another to form a rectangular frame. The frame rails included are a front frame rail or head rail assembly 26, a left side frame rail assembly 28, a right side frame rail assembly 30, and a rear frame rail assembly 32. Rail support system 24 is aligned with and coupled to the top of sidewalls 16 and 18 of cargo box 13 as well as the top of front wall 14 and tailgate 20, according to one of many methods. A clamping system or fastening system may be used to fasten the rail assemblies 26, 28, 30, and 32 to the sidewalls 16 and 18 of pickup truck 10. An example of a clamping system can be found in commonly-assigned U.S. patent application Ser. No. 10/331,711, entitled "Roll Up Tonneau Cover System." The disclosure of this application is incorporated herein by reference. Stretchable fabric cover 22 is support cross-vehicle via a plurality of cross bows 301, which each selectively engage corresponding retaining members coupled to left side frame rail assembly 28 and right side frame rail assembly 30, which will be discussed in detail below.

It should be understood that right sidewall 18 and left sidewall 16 of pickup truck 10 and the corresponding right side frame rail assembly 30 and left side frame rail assembly 28 are identical in construction, yet arranged in mirrored symmetry. Accordingly, in the interest of brevity, only one side will be discussed in detail below unless noted otherwise.

Still referring to FIGS. 1 and 2, right side frame rail assembly 30 is coupled to right sidewall 18 of cargo box 13 of pickup truck 10. As can be seen, sidewall 18 of cargo box 13 includes a generally horizontal top surface 34 and a downwardly extending inside wall 36. However, it should be appreciated that generally horizontal top surface 34 and downwardly extending inside wall 36 may have any one of a number of configurations, which are dependent upon styling and functionality determined by the vehicle manufacturer. Hence, it should be understood that the particular shape of these surfaces/walls may vary, along with the specific shape of those corresponding components of frame rail assembly 30.

Figure 3:
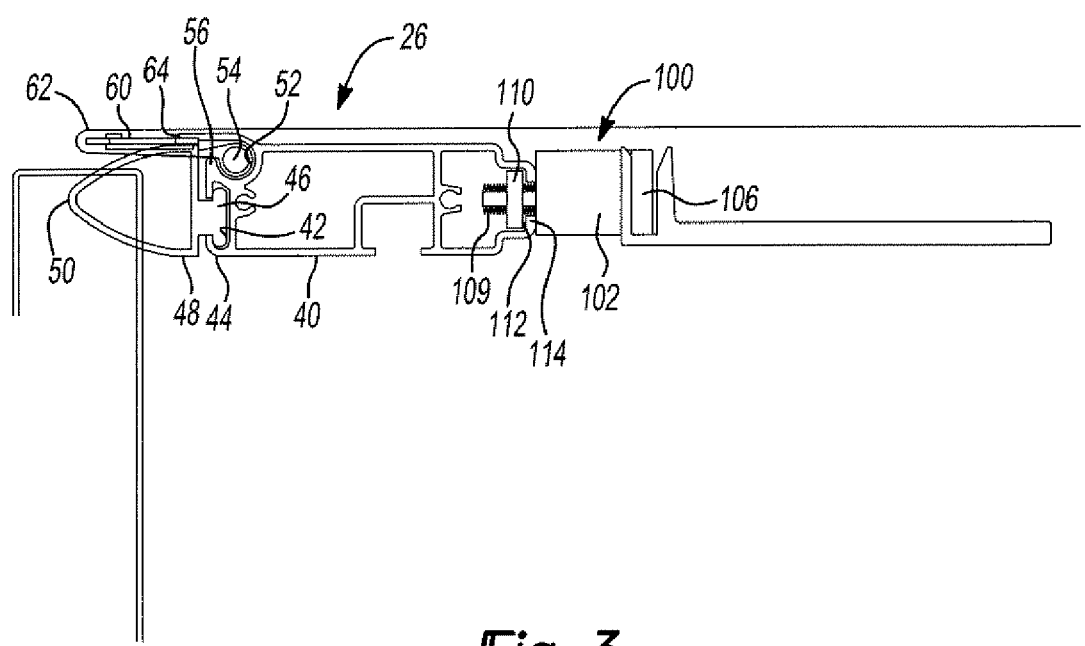
FIG. 3 is a cross sectional view illustrating the head rail assembly taken along line 3—3 of FIG. 1.

Turning now to FIG. 3, head rail assembly 26 will now be described in detail. As can be seen in the figure, head rail assembly 26 generally includes an extruded front bracket member 40. Extruded front bracket member 40 is preferably made of a light-weight, corrosion resistant material, such as aluminum. Extruded front bracket member 40 includes a gasket channel 42 extending longitudinally along a forward portion 44 of extruded front bracket member 40. Gasket channel 42 is sized to receive a corresponding channel feature 46 of a flexible gasket member 48 such that flexible gasket member 48 is coupled with and supported by extruded front bracket member 40. Gasket member 48 is positionable such that it engages and forms a fluid seal between a nose portion 50 of gasket member 48 and front wall 14 of pickup truck 10. In this regard, water and other environmental contaminants are prevented from entering cargo box 13 of pickup truck 10. During assembly, channel feature 46 of flexible gasket member 48 is slid into gasket channel 42.

Extruded front bracket member 40 further includes cover retaining slot 52 extending longitudinally along forward portion 44 of extruded front bracket member 40. Cover retaining slot 52 is sized to receive a corresponding rod member 54. Preferably, rod member 54 is received within a channel 56 sewn or otherwise formed in stretchable fabric cover 22. In this regard, stretchable fabric cover 22 is reliably retained in connection with extruded front bracket member 40. During assembly, rod member 54 is first slid into channel 56 of stretchable fabric cover 22 and the two are slid into cover retaining slot 52.

Still referring to FIG. 3, extruded front bracket member 40 further includes a tip support 60 extending along forward portion 44. Tip support 60 is adapted to be received between a fold-back portion 62 of stretchable fabric cover 22 and provides support to stretchable fabric cover 22. Tip support 60 permits stretchable fabric cover 22 to extend forward from extruded front bracket member 40 to bridge a gap between extruded front bracket member 40 and front wall 14 and to further conceal gasket member 48. Tip support 60 may be received within a support channel 64 formed in extruded front bracket member 40. However, it should also be understood that tip support 60 may be integrally formed with extruded front bracket member 40 or may be part of a separate polymer extrusion to which the stretchable fabric cover 22 is sewn. This extrusion would be slidably engaged with bracket member 40.

Figure 4:
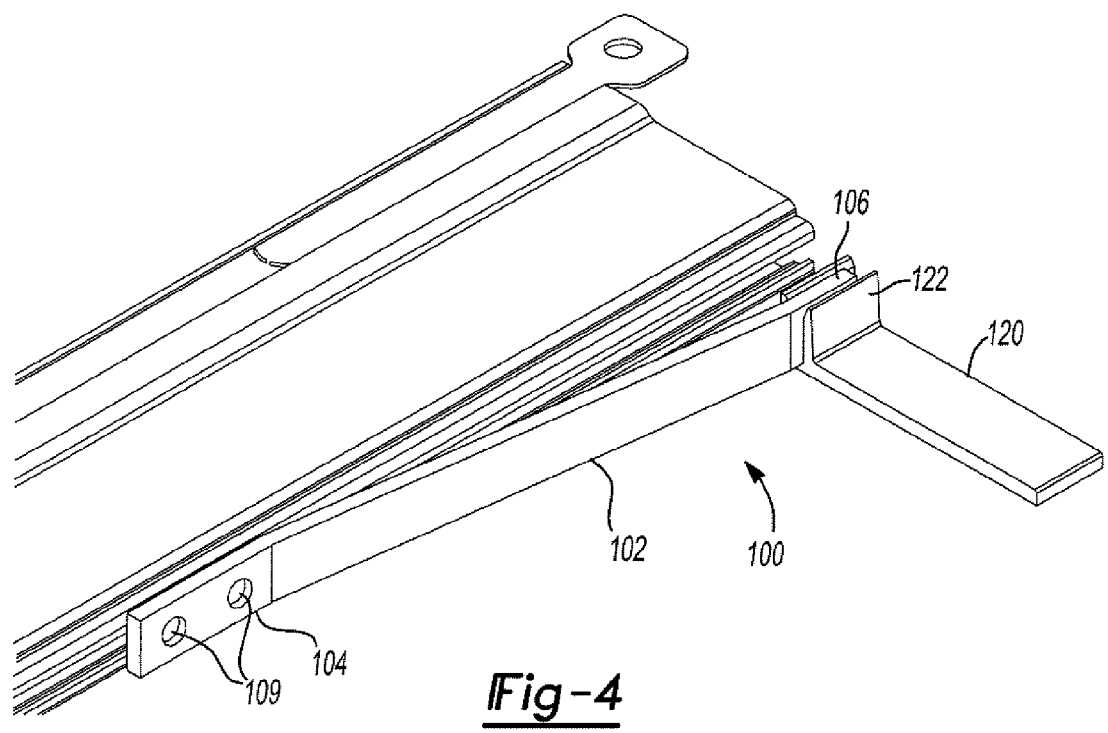
FIG. 4 is an enlarged perspective view illustrating the adjustment beam mechanism.

Referring now to FIGS. 3 and 4, tonneau system 12 further includes an adjustment beam mechanism 100 engagable with extruded front bracket member 40. Adjustment beam mechanism 100 is provided for maintaining a constant tensional force on stretchable fabric cover 22 to a desired tightness. Adjustment beam mechanism 100 includes a cantilever beam member 102 having a first end 104 and a second end 106. First end 104 of cantilever beam member 102 is fixedly mounted to extruded front bracket member 40 via conventional fasteners 109 and a mounting bracket 110. Mounting bracket 110 is slidably engaged in slot 112 of extruded front bracket member 40. Mounting bracket 110 is preferably sized to permit simple positioning of mounting bracket 110 and cantilever beam member 102 relative to extruded front bracket member 40 when the fasteners are loosened. However, on the other hand, mounting bracket 110 should preferably frictionally engage flanges 114 when the fasteners are tightened.

As best seen in FIGS. 2–4, adjustment beam mechanism 100 further includes a finger member 120, which is operably coupled to frame rail assembly 30. Finger member 120 is sized to extend upward from frame assembly 30 in a generally L-shaped configuration. An end 122 of finger member 120 is engagable with second end 106 of cantilever beam member 102. Such engagement of finger member 120 against the biasing force of cantilever beam member 102 cause extruded front bracket member 40 to be urged forward (relative to the vehicle) to draw stretchable fabric cover 22 tightly over rail support system 24.

It should be understood that cantilever beam member 102 may be pre-bent to tailor a desired biasing force. It is generally desired that adjustment beam mechanism 100 is disposed on each side of the vehicle bed to provide equal tensioning thereabout. Specifically, it is desired that adjustment beam mechanism 100 is arranged to provide about 15 to 10 pounds of tensioning force on each side.

Figure 5:
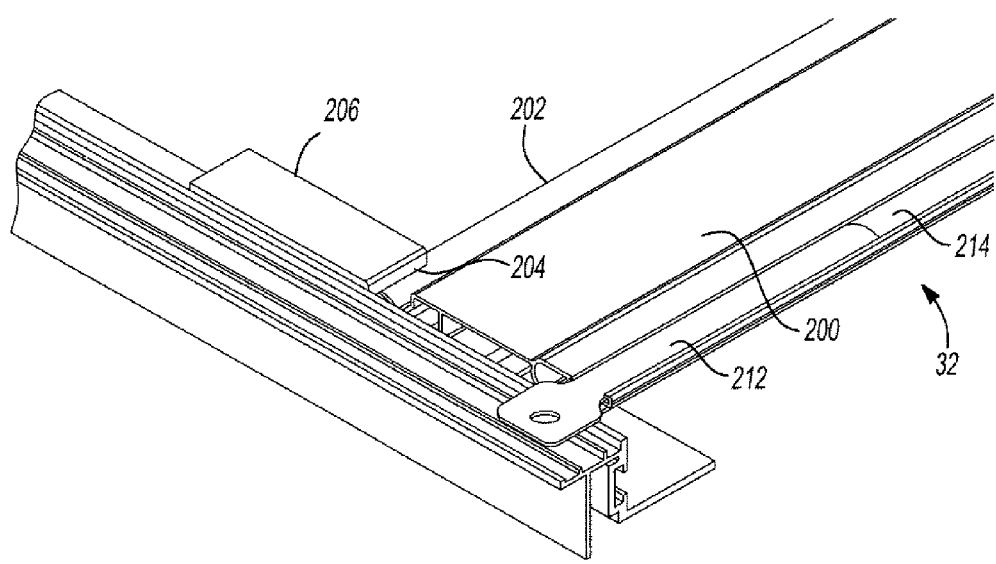
FIG. 5 is an enlarge perspective view illustrating the rear frame rail assembly.

Turning now to FIG. 5, rear frame rail assembly 32 will be described in detail. Rear frame rail assembly 32 generally includes an extruded rear bracket member 200. Rear bracket member 200 is similar in construction to front bracket member 40; however, rear bracket member 200 includes a rounded bull nose portion 202. Rear bracket member 200 further includes a receiving channel 56' for receiving rod member 54 coupled to fabric cover 22 similarly as mentioned above. Rear frame rail assembly 32 still further includes a latching system, such as that described in commonly-assigned U.S. patent application Ser. No. 10/331,711, entitled "Roll Up Tonneau Cover System."

With continued reference to FIG. 5, rounded bull nose portion 202 of rear bracket member 200 is sized to be pivotally received within a concave portion 204 of a corresponding rear pivot block 206. In this regard, rear frame rail assembly 32 may pivot upward about the interface between rounded bull nose portion 202 and concave portion 204 into a raised position (see FIG. 6). In this raised position, the tension in fabric cover 22 is released. However, in a lowered position, the tension is then again exerted upon fabric cover 22 according to the biasing force of adjustment beam mechanism 100. Rear pivot block 206 is fixedly coupled to frame rail assembly 30 via conventional means, such as fasteners. It should be appreciated that as rear bracket member 200 is lowered into a down position, fabric cover 22 is drawn rearward against the biasing force of adjustment beam mechanism 100. During this operation, fabric cover 22 is translated rearward a predetermined distance. This translation distance will be used to affect additional retaining features that will be described in detail below. During an opposing operation, the raising or pivoting of rear bracket member 200 causes the tension in fabric cover 22 to be released, which causes fabric cover 22 to translate forward in response to the biasing forces of adjustment beam mechanism 100.

Still referring to FIG. 5, rear bracket member 200 further includes a strip member 212 extending along rearward portion 210. Strip member 212 is adapted to be sewn into fabric cover 22 and provides support to stretchable fabric cover 22. Strip member 212 may be received within a support channel 214 formed in rear bracket member 200. However, it should also be understood that strip member 212 may be integrally formed with rear bracket member 200.

With reference to FIGS. 15–22, an alternative rear frame assembly and latch system 500 will be described in detail. Rear frame rail and latch system 500 generally comprises an extruded rear bracket member 510, a latching assembly 512, and frame rail assembly 30. Rear bracket member 510 is similar in construction to rear bracket member 200 and front bracket member 400 except for the features that will be described herein. Rear bracket member 510 and latching assembly 512 work together to define a system that captures and retains rear bracket member 510 relative to latching assembly 512, yet permits lateral movement of rear bracket member 510 relative to latching assembly 512.

With particular reference to FIGS. 15 and 17–20, rear bracket member 510 is illustrated being made of a lightweight, corrosion resistant material, such as aluminum. Rear bracket member 510 generally comprises a top face 514, a bottom face 516, an interconnecting inclined face 518 disposed between top face 514 and bottom face 516, and a latching face 520. Top face 514 is generally disposed in planar relationship with a top section of latching assembly 512, which will be described herein. Bottom face 516 is disposed parallel to, but spaced offset from, a top portion of tailgate 20. It is anticipated that stretchable fabric cover 22 will extend along top face 514, down inclined face 518, and terminate at an intersection of inclined face 518 and bottom face 516. To this end, a cover retaining slot 522 extends longitudinally along an edge of rear bracket member 510. Cover retaining slot 522 is sized to receive a corresponding rod member 54. Preferably, rod member 54 is received within a channel 56 sewn or otherwise formed in stretchable fabric cover 22. In this regard, stretchable fabric cover 22 is reliably retained in connection with rear bracket member 510. During assembly, rod member 54 is first slid into channel 56 of stretchable fabric cover 22 and the two are slid into cover retaining slot 522.

A seal groove 524 is disposed adjacent cover retaining slot 522 for receiving a seal member 526 therein. Seal member 526 is adapted to sealingly engage and/or contact a top surface of tailgate 20. Seal member 526 may have any cross-sectional shape that is conducive to sealingly engage the top surface of tailgate 20.

A slidenut channel 528 is disposed along bottom face 516. Slidenut channel 528 is provided for coupling additional accessories, such as additional seals and/or coverings to rear bracket member 510 using a conventional fastener and sliding nut arrangement. In other words, a nut (not shown) may be slidably disposed within slidenut channel 528 such that the nut is retained by flanges 530 (FIG. 20) of slidenut channel 528. A fastener (not shown) can be used to couple an accessory to the nut in a predetermined position. Alternatively, an accessory can be provided having a complimentary engaging feature that can be slid within slidenut channel 528. Rear bracket member 510 may further comprise an upwardly turned hook member 532 extending from top face 514, which will be described herein.

Referring now to FIGS. 16–21, latching assembly 512 comprises a stanchion 534, a pivot block 536, and a latch member 538. Stanchion 534 may be injection molded and may include a pair of upwardly extending leg members 540 extending from a base member 542. Base member 542 can comprise a flange rail system 544 that is sized to be slidingly engaged within a corresponding channel 546 (FIG. 20) formed in side frame rail assembly 30. Accordingly, stanchion 534 can be slid within channel 546 to a predetermined position and retained in this predetermined position using a conventional fastener and/or slidenut system.

Each leg member 40 of stanchion 534 comprises an aperture 548 formed therethrough coaxially aligned with each other. Apertures 548 are sized to slidably receive a guide member or bolt 550 therethrough. Guide member 550 may include a fastener (not shown) disposed on an end 552 of guide member 550 to permit sliding movement of guide member 550 relative to stanchion 534 but resist disengagement of guide member 550 from stanchion 534. An opposing end 554 of guide member 550 may be fixedly coupled with pivot block 536. A spring member 558 may be disposed about a section of guide member 550 between stanchion 534 and pivot block 536. A first end 560 of spring member 558 may be received within a counter bore 562 formed about aperture 548 within one of the leg members 540 of stanchion 534. An opposing end 563 of spring member 558 may engage pivot block 536 to urge pivot block 536 away from stanchion 534. In operation, spring member 558 may, at least in part, urge rear bracket member 510 away from head rail assembly 26, thereby tightly drawing stretchable fabric cover 22.

Figure 20:
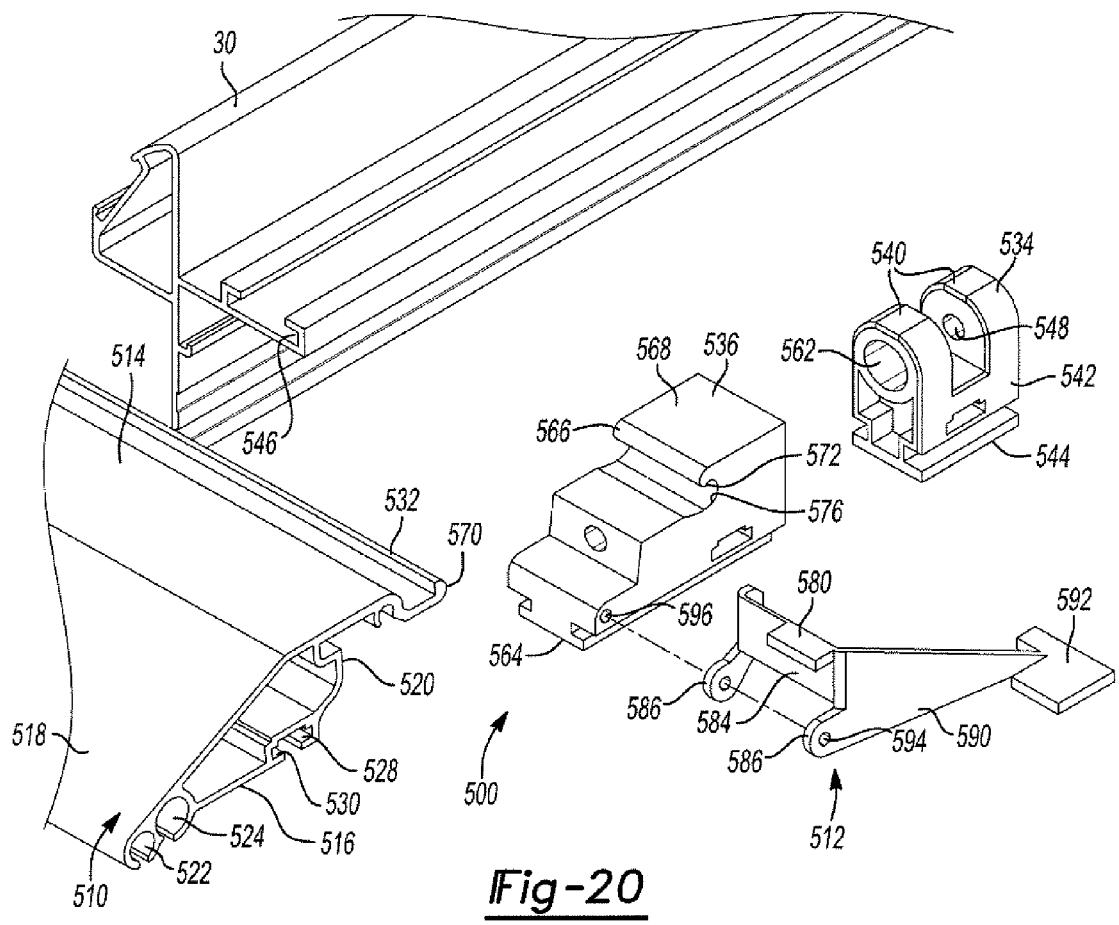
FIG. 20 is an exploded perspective view illustrating the rear frame assembly of FIG. 15.
Figure 21:
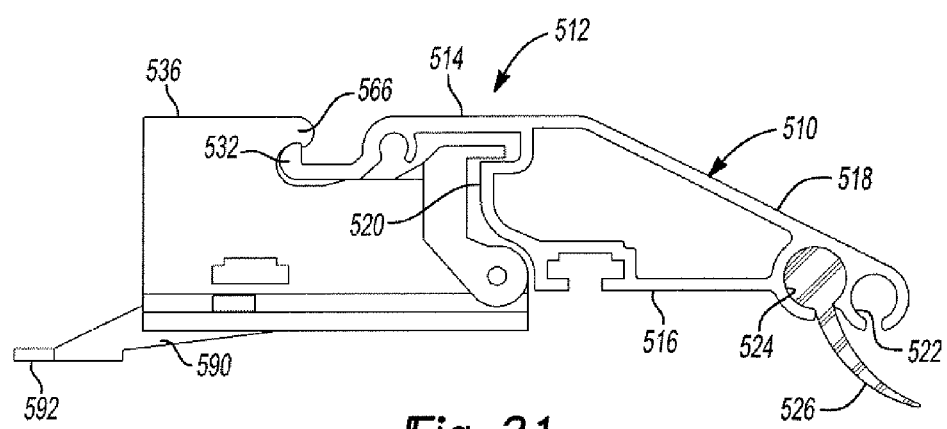
FIG. 21 is a side view illustrating the rear bracket member, pivot block, and locking pawl system in a down and locked position.

As seen in FIG. 20, pivot block 536 comprises a flange rail system 564 that is sized to be sligingly engaged within corresponding channel 546 formed inside frame rail assembly 30. Accordingly, pivot block 536 can be slid within channel 546 in response to the urging force exerted by spring member 558. In other words, in some embodiments, pivot block 536 can freely slide within channel 546 as needed. In some embodiments, pivot block 536 may comprise a slide-nut channel 565 that is sized to receive a nut (not shown) therein such that the nut may be coupled with a fastener (not shown) to fixedly mount pivot block 536 within channel 546.

Figure 18:
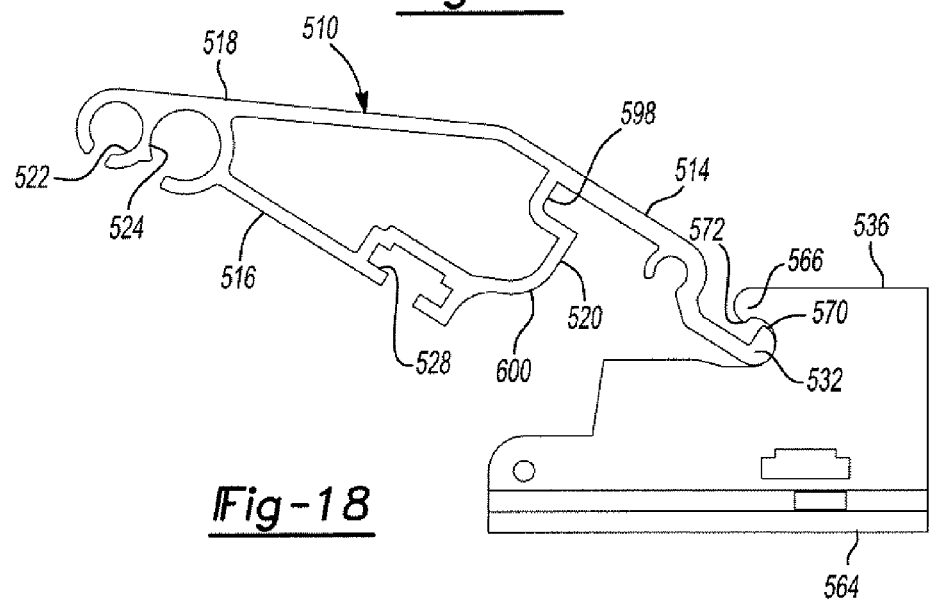
FIG. 18 is a side view illustrating a rear bracket member and a pivot block in an initial position.
Figure 19:
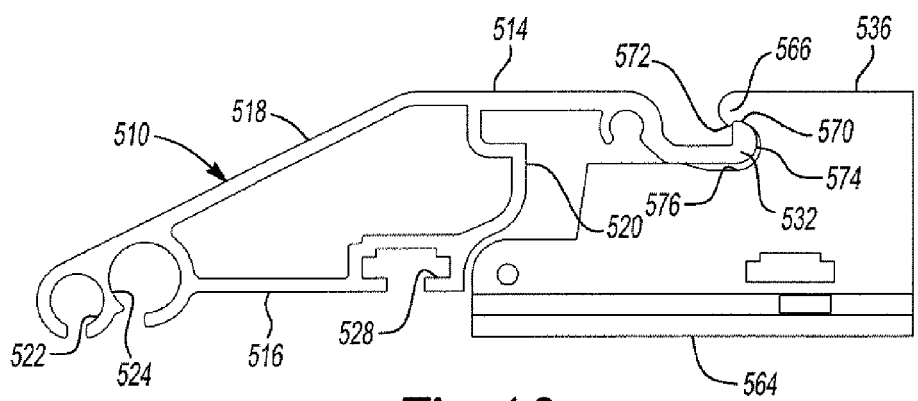
FIG. 19 is a side view illustrating the rear bracket member and the pivot block in a down and locked position.

Pivot block 536 further comprises a downwardly turned hook member 566 extending from a top face 568. Downwardly turned hook member 566 is sized and shaped to engage and receive upwardly turned hook member 532 of rear bracket member 510. As can be seen in FIGS. 18 and 19, a distal end 570 of upwardly turned hook member 532 can be captured by a distal end 572 of downwardly turned hook member 566 as rear bracket member 510 is rotated into a down and locked position (FIG. 19). Additionally, a bull nose portion 574 of upwardly turned hook member 532 can engage and ride along a concave portion 576 of downwardly turned hook member 566 to provide a smooth transition between the initial insertion position (FIG. 18) and the down and locked position (FIG. 19). It should be appreciated that the interconnection of downwardly turned hook member 566 and upwardly turned hook member 532 provides a positive and fixed position between rear bracket member 510 and pivot block 536 in a fore-aft direction of pickup truck 10, yet permits lateral movement of rear bracket member 510 relative to pivot block 536 in the cross-vehicle direction. This encourages proper alignment of tonneau system 12.

Figure 16:
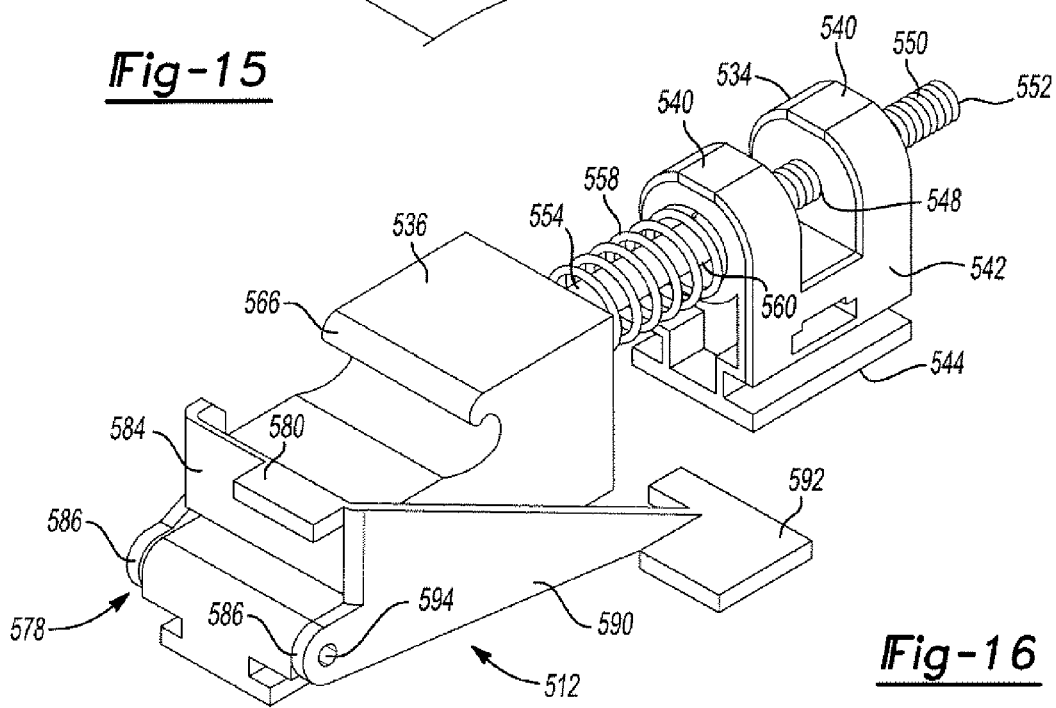
FIG. 16 is a perspective view illustrating a latching assembly.
Figure 17:
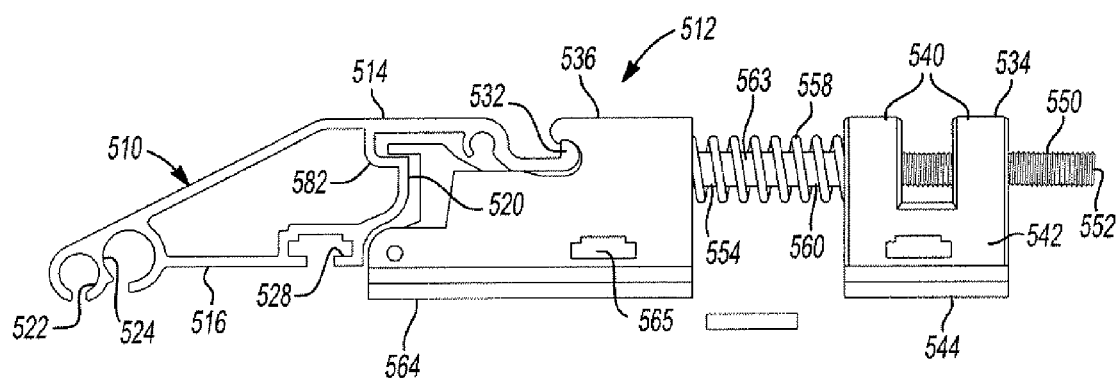
FIG. 17 is a side view illustrating the latching assembly.

To retain rear bracket member 510 in the down and latched position, a locking pawl system 578 is provided having a latch pawl 580 selectively engageable with a latch feature 582 (FIG. 17) formed in rear bracket member 510. As seen in FIG. 16, latch pawl 580 comprises a pawl face 584, a pair of leg members 586 extending from pawl face 584, latch pawl 580 extending from pawl face 584, and an extension arm 590 extending from pawl face 584 and terminating at a finger portion 592. Latch pawl 580 is adapted to be pivoted about an axis 594 extending through leg members 586 and an aperture 596 (FIG. 20) formed in pivot block 536. Latch pawl 580 may be spring biased into a locked position. Latch pawl 580 is sized to be received within latch feature 582. In some embodiments, latch feature 582 may comprise a ledge or other cut-out 598 (FIG. 18) operable to engage latch pawl 580 when in a locked position. Alternatively, such arrangement would permit free rotation of rear bracket member 510 relative to pivot block 536 when latch pawl 580 is disengaged from latch feature 582.

In operation, rear bracket member 510, having stretchable fabric cover 22 disposed thereabout and retained by rod member 54 and cover retaining slot 522, can be lifted to reveal cargo box 13 of pick-up truck 10. However, to retain and lock rear bracket member 510 in a down and locked position, rear bracket member 510 is first engaged with pivot block 536 such that upwardly turned hook member 532 of rear bracket member 510 is received with downwardly turned hook member 566 of pivot block 536 (FIG. 18). Rear bracket member 510 is then pivoted downwardly such that top face 514 of rear bracket member 510 is generally planar with top face 568 of pivot block 536. As rear bracket member 510 pivots about pivot block 536, latch pawl 580 can engage and ride along a curved portion 600 (FIG. 18) of latching face 520 of rear bracket member 510. In this regard, latch pawl 580 will cam along curved portion 600 until being received within latch feature 582, thereby latching rear bracket member 510 relative to pivot block 536. Alternatively, finger portion 592 may be depressed such that latch feature 582 is rotated about axis 594, thereby retracting latch pawl 580 from contact with latching face 520 of rear bracket member 510. In this regard, rear bracket member 510 can be rotated downward into the down position and finger portion 592 can be released to urge latch pawl 580 into locking engagement with latch feature 582.

Figure 6:
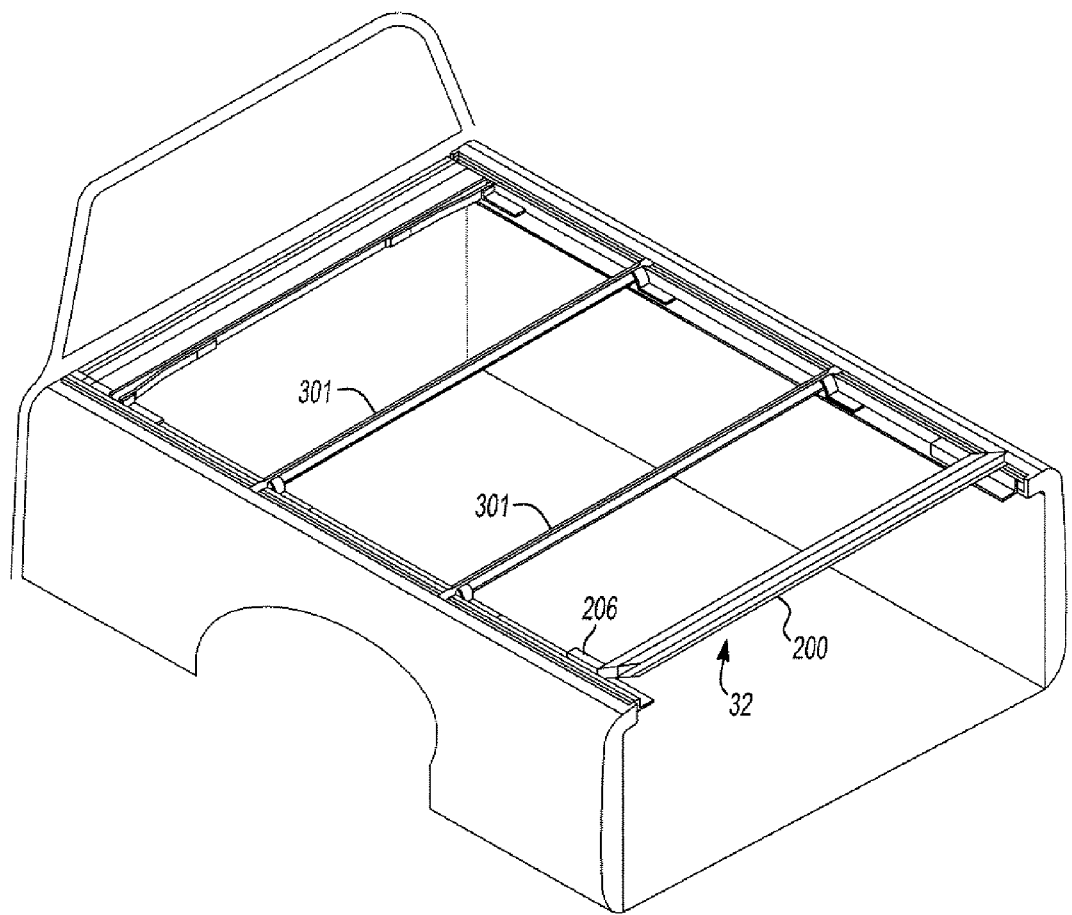
FIG. 6 is a perspective view illustrating the pickup truck having the tonneau cover system with portions removed for clarity and the rear frame rail assembly in a raised position.
Figure 7:
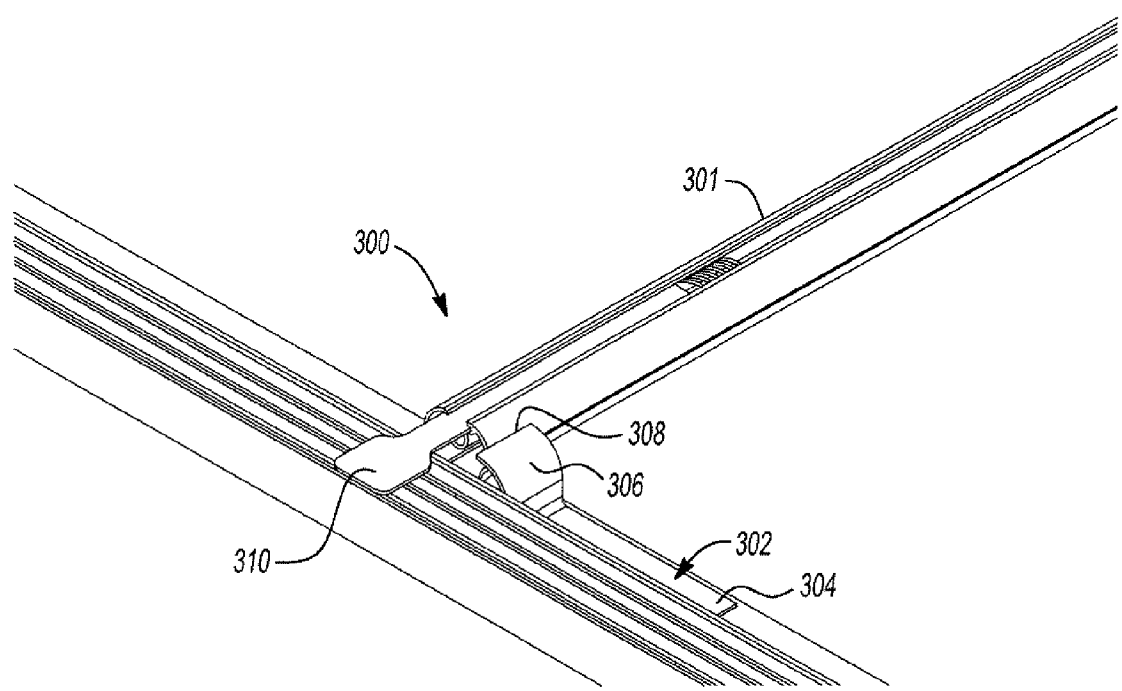
FIG. 7 is an enlarged perspective view illustrating the bow member and retaining bracket.

Turning now to FIGS. 6 and 7, it can be seen that tonneau system 12 further includes a retaining system 300 for retaining sections of fabric cover 22 located between head rail assembly 26 and rear frame rail assembly 32. As best seen in FIG. 6, retaining system 300 includes a plurality of cross vehicle bow members 301 operably coupled with fabric cover 22 and engaging retaining brackets 302 fixedly coupled to frame rail assembly 28, 30. Retaining brackets 302 may be of any shape or design; however, two possible configurations will be discussed herein.

With reference to FIGS. 6 and 7, retaining bracket 302 is illustrated as a generally sheet-like member shaped to define a generally planar section 304 and a receiving section 306. Planar section 304 is disposed adjacent frame rail assembly 28, 30 and fastened thereto via conventional means, such as fasteners. Receiving section 306, however, is shaped to receive a corresponding portion of vehicle bow member 301. That is, in the embodiment illustrated in FIGS. 6 and 7, vehicle bow member 301 is generally cylindrical in cross-section. Accordingly, receiving section 306 is generally cylindrical, concave in shape to readily receive and retaining vehicle bow member 301 therein. Receiving section 306 extends upward to an end 308, which is positioned relative to vehicle bow member 301 to generally prevent vehicle bow member 301 from disengaging with retaining bracket 302 in a vertical direction.

Vehicle bow member 301 is generally cylindrical in cross-section. Vehicle bow member 301 may define an enclosed tubular member or may be constructed of rolled aluminum, or other material. Preferably, vehicle bow member 301 further includes an optional paddle-shaped bow end 310 extending outwardly from vehicle bow member 301. Paddle-shaped bow end 310 overlaps a portion of frame rail assembly 28, 30. Paddle-shaped bow end 310 serves to push outwardly in a lateral direction (in the cross-vehicle direction) keeping the stretchable fabric cover 22 taunt. Paddle-shaped bow end 310 further biases the periphery of stretchable fabric cover 22 down to seal against frame rail assembly 28, 30. Frame rail assembly 28, 30 have alternating high and low sections that act as a labyrinthian seal.

Figure 8:
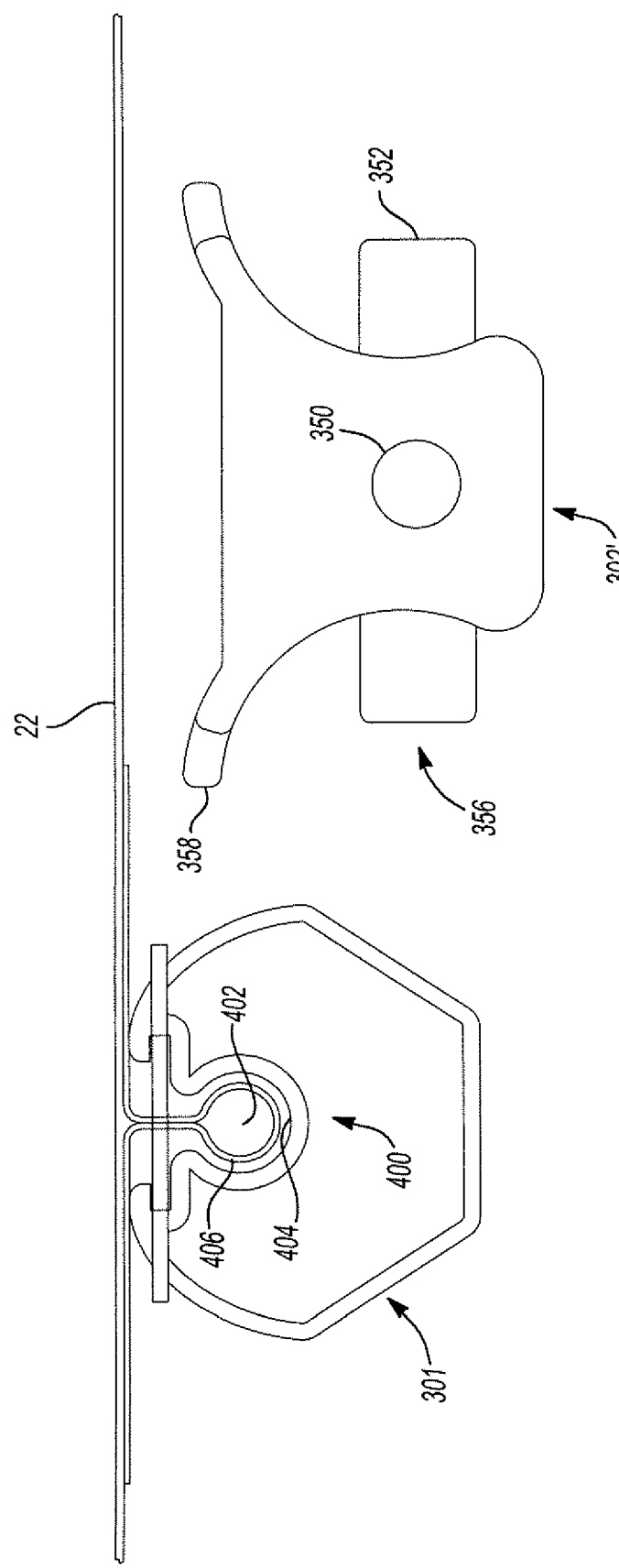
FIG. 8 is a side view illustrating the bow member and retaining block member in a released position.
Figure 9:
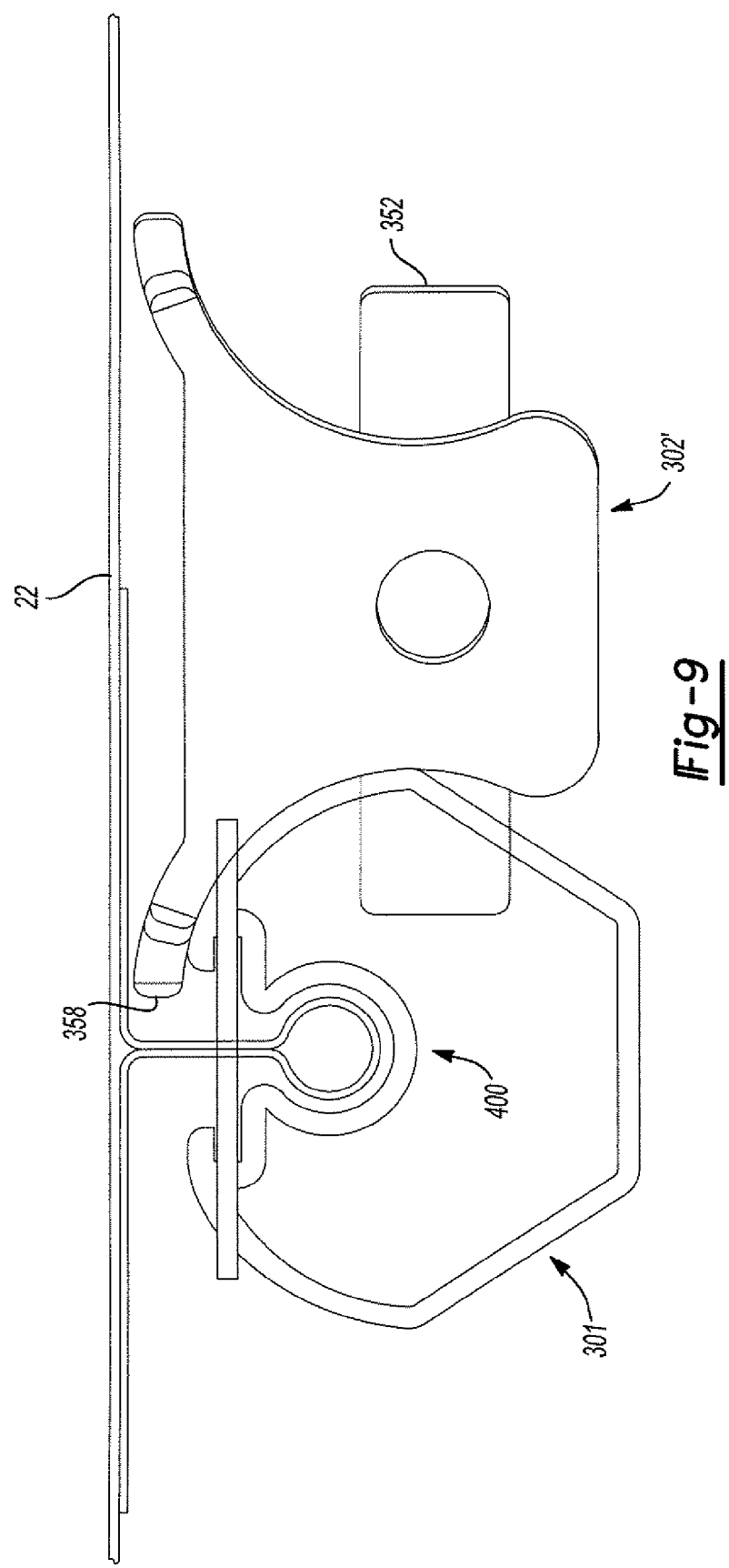
FIG. 9 is a side view illustrating the bow member and retaining block member in a retained position.
Figure 10:
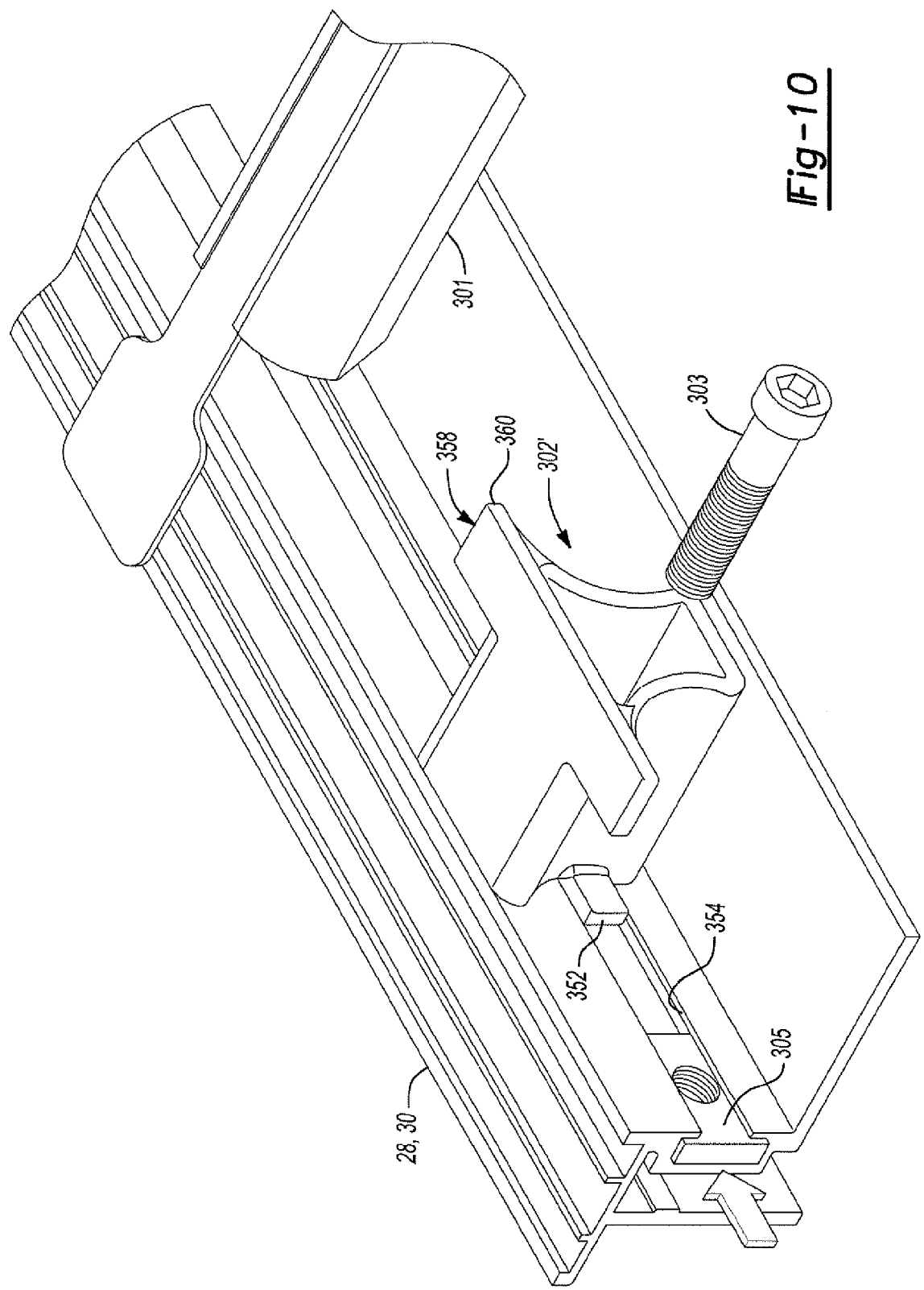
FIG. 10 is an enlarged perspective view illustrating the retaining block member.
Figure 11:
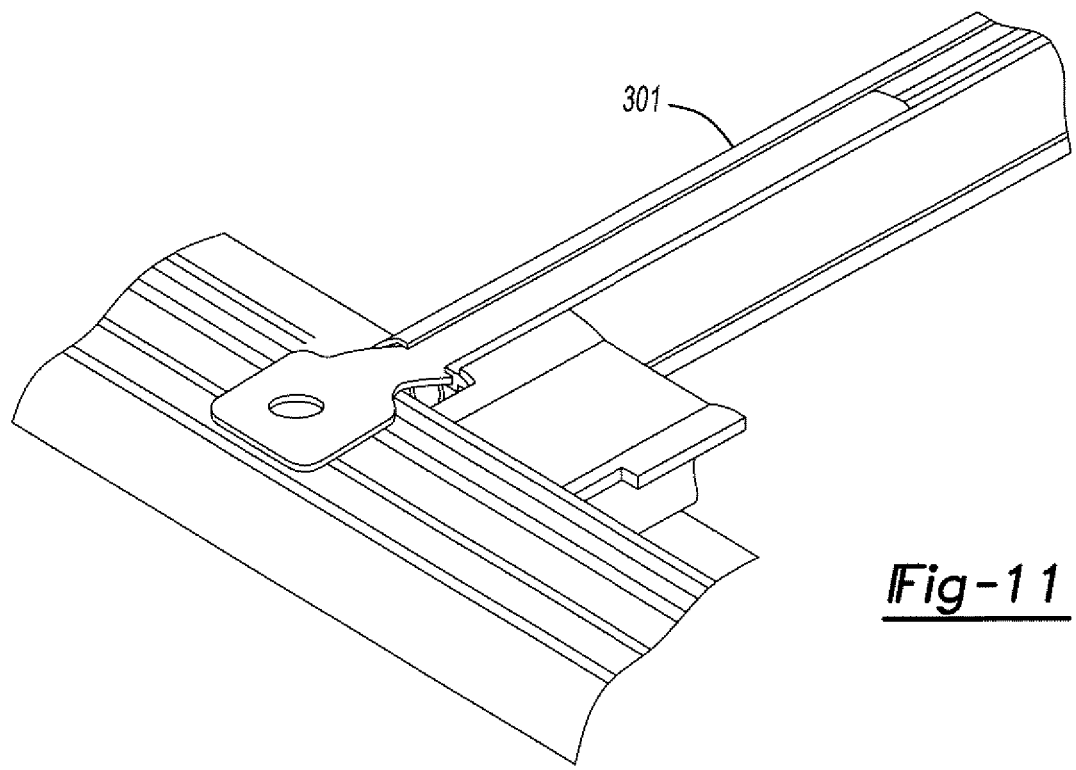
FIG. 11 is an enlarged perspective view illustrating the bow member in the retained position.
Figure 12:
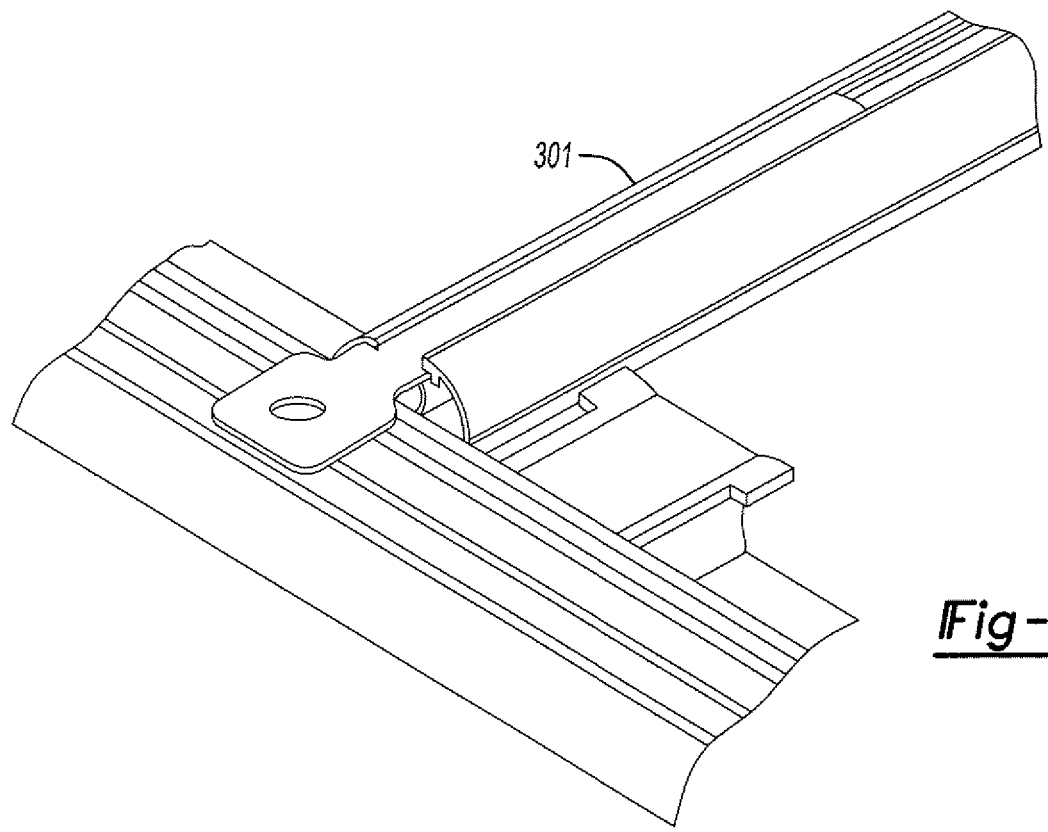
FIG. 12 is an enlarged perspective view illustrating the bow member in the released position.
Figure 15:
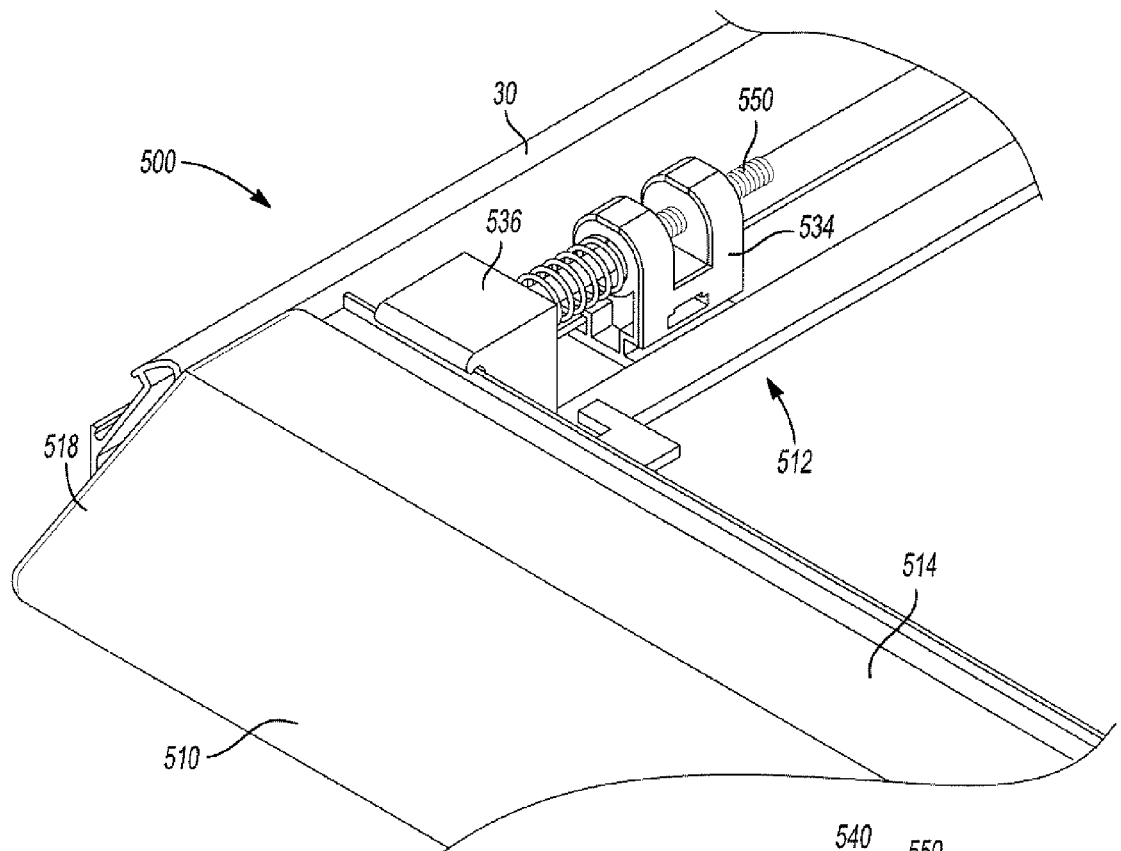
FIG. 15 is a perspective view illustrating a rear frame assembly according to another embodiment.

Alternatively, as seen in FIGS. 8–12, retaining bracket 302 may be made as a block member, generally indicated at 302'. Retaining block member 302' is preferably made of a Nylon or other plastic material and is injection molded. Retaining block member 302' is preferably fastened to frame rail assembly 28, 30 via a fastener 303 extending through an aperture 350 formed in retaining block member 302'. Fastener 303 engages a sliding bracket 305 received within frame rail assembly 28, 30. Retaining block member 302' further includes a tab member 352 that is sized to be slidably received within a channel 354 of frame rail assembly 28, 30. Tab member 352 and channel 354 cooperate to prevent, or at least, minimize rotation of retaining block member 302' to ensure proper positioning of retaining block member 302'. Retaining block member 302' further includes a receiving section 356, which is shaped to receive a corresponding portion of vehicle bow member 301. That is, in the embodiment illustrated in FIGS. 8–12, vehicle bow member 301 is generally cylindrical in cross-section. Accordingly, receiving section 356 is generally cylindrical, concave in shape to readily receive and retaining vehicle bow member 301 therein. Receiving section 356 extends upward to an end 358, which is positioned relative to vehicle bow member 301 to generally prevent vehicle bow member 301 from disengaging from retaining block member 302' in a vertical direction. More particularly, as seen in FIG. 10, end 358 may terminate at a single finger 360, if desired.

Turning now to FIGS. 13 and 14, it can be seen that vehicle bow member 301 is engaged and retained within receiving section 356 when rear bracket member 200 is lowered (see FIG. 13), while conversely vehicle bow member 301 is released and free to be raised when bracket member 200 is raised (see FIG. 14). It is worth noting that this operating is illustrated in FIGS. 13 and 14 in connection with retaining bracket 302 and retaining block member 302'.

As best seen in FIGS. 8 and 9, vehicle bow member 301 is coupled to fabric cover 22 through a coupling system 400. Coupling system 400 includes a rod or cord member 402 slidably received within a bow channel 404 extending longitudinally through vehicle bow member 301. Cord member 402 captures a portion 406 of fabric cover 22 simply by routing fabric cover 22 around cord member 402. The shape of bow channel 404 retaining cord member 402 therein, thereby preventing fabric cover 22 from disengaging from vehicle bow member 301. Most preferably, portion 406 of fabric cover 22 is sewn into fabric cover 22 to prevent migration of fabric cover 22 relative to cord member 402. It should be understood that this positive coupling of fabric cover 22 to vehicle bow member 301 (and the corresponding coupling of vehicle bow member 301 to either retaining bracket 302 or retaining block member 302') serves to retain and prevent rising of fabric cover 22 during vehicle travel.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of locking a cover of a vehicle, said method comprising:
    providing a cover spanning at least a portion of a frame, said frame having a pivot block;
    coupling said cover to a bracket member;
    engaging and rotating said bracket member relative to said pivot block from a first position to a second position; and
    releasably locking said bracket member relative to said pivot block when said bracket member is in said second position, said step of releasably locking said bracket member including:
        providing a locking pawl system rotatably coupled to said pivot block, said locking pawl system positionable between a retracted position and an extended position;
        urging said locking pawl system into said retracted position while said engaging and rotating said bracket member relative to said pivot block from said first position to said second position; and
        positioning said locking pawl system in said extended position to engage and retain said bracket member relative to said pivot block.

2. The method according to claim 1 wherein said providing a locking pawl system comprises:
    providing a locking pawl system having pawl extending from a pawl face and an extension arm extending from said pawl face, said extension arm terminating at a finger portion.

3. The method according to claim 1, further comprising:
    applying a biasing force to said locking pawl system to urge said locking pawl system into said extended position.

4. The method according to claim 1 wherein said engaging and rotating said bracket member relative to said pivot block from said first position to said second position is completed such that said rotating applies a tensioning force to said cover translating said cover in a first direction and causing a bow member of said cover to engage a retaining member of said frame.

5. The method according to claim 1, further comprising:
    providing a stanchion member coupled to said frame; and
    providing a biasing member between said stanchion member and said pivot block, said pivot block being free to translate along said frame, said biasing member urging said pivot block away from said stanchion member.

6. The method according to claim 1 wherein said engaging and rotating said bracket member relative to said pivot block from said first position to said second position further comprises permitting cross-vehicle translation of said bracket member relative to said pivot block while inhibiting fore-aft vehicle translation.

7. The method according to claim 1 wherein said engaging and rotating said bracket member relative to said pivot block from said first position to said second position comprises:
    providing a downwardly turned hook member on said pivot block;
    providing an upwardly turned hook member on said bracket member; and
    engaging said upwardly turned hook member of said bracket member with said downwardly turned hook member of said pivot block and rotating said bracket member relative to said pivot block from said first position to said second position.

8. A method of locking a cover of a vehicle, said method comprising:
    coupling a cover to a bracket member;
    slidably coupling a pivot block to the vehicle;
    engaging said bracket member to said pivot block and rotating said bracket member relative to said pivot block from a raised position to a lowered position; and
    automatically locking said bracket member relative to said pivot block when said bracket member is in said lowered position, said step of automatically locking said bracket member including:
        providing a locking pawl system rotatably coupled to said pivot block, said locking pawl system positionable between a retracted position and an extended position;
        urging said locking pawl system into said retracted position during said engaging said bracket member to said pivot block and rotating said bracket member relative to said pivot block from said raised position to said lowered position; and
        positioning said locking pawl system in said extended position to engage and retain said bracket member relative to said pivot block.

9. The method according to claim 8 wherein said providing a locking pawl system comprises:
provifing a locking pawl system having pawl extending from a pawl face and an extension arm extending from said pawl face, said extension arm terminating at a finger portion.

10. The method according to claim 8, further comprising:
applying a biasing force to said locking pawl system to urge said locking pawl system into said extended position.

11. The method according to claim 8 wherein said engaging said bracket member to said pivot block and rotating said bracket member relative to said pivot block from said raised position to said lowered position is completed such that said rotating applies a tensioning force to said cover translating said cover in a first direction and causing a bow member of said cover to engage a retaining member of said frame.

12. The method according to claim 8, further comprising:
providing a stanchion member coupled to the vehicle; and
providing a biasing member between said stanchion member and said pivot block, said pivot block being free to translate in a fore-aft direction along the vehicle, said biasing member urging said pivot block away from said stanchion member.

13. The method according to claim 8 wherein said engaging said bracket member to said pivot block and rotating said bracket member relative to said pivot block from said raised position to said lowered position further comprises permitting cross-vehicle translation of said bracket member relative to said pivot block while inhibiting fore-aft vehicle translation.

14. The method according to claim 8 wherein said engaging said bracket member to said pivot block and rotating said bracket member relative to said pivot block from said raised position to said lowered position comprises:
providing a downwardly turned hook member on said pivot block;
providing an upwardly turned hook member on said bracket member; and
engaging said upwardly turned hook member of said bracket member with said downwardly turned hook member of said pivot block and rotating said bracket member relative to said pivot block from said raised position to said lowered position.

* * * * *